Jan. 17, 1933. L. W. THOMPSON 1,894,837
ELECTRICAL REGULATION
Filed May 19, 1931
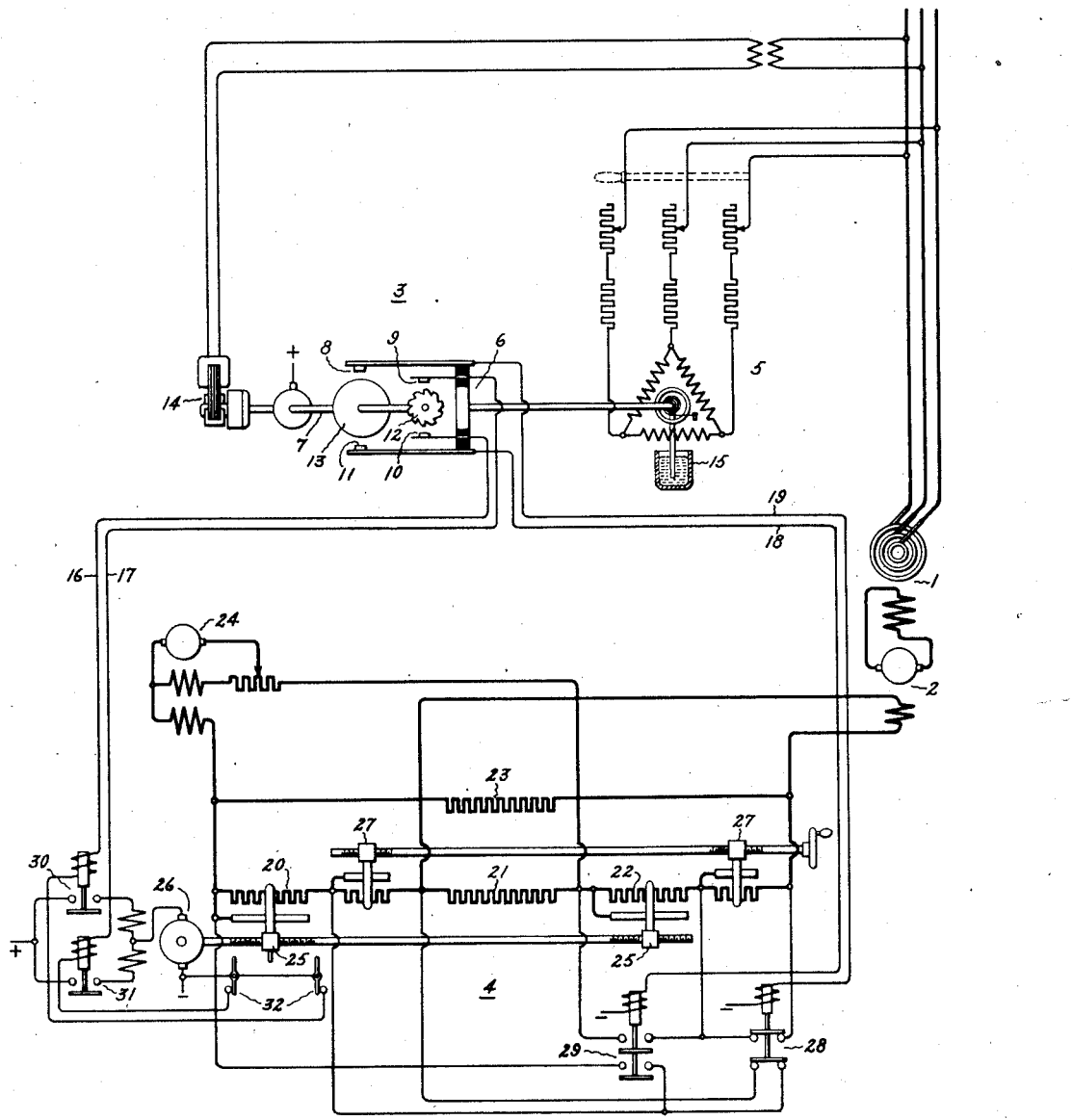
Inventor:
Louis W. Thompson,
by Charles W. Mullan
His Attorney.

Patented Jan. 17, 1933

1,894,837

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

ELECTRICAL REGULATION

Application filed May 19, 1931. Serial No. 538,508.

My invention relates to electrical regulation and particularly to improvements in resistance type electrical regulating arrangements.

In my copending application, Serial No. 478,463, filed August 28, 1930, and assigned to the assignee of the present application, I have disclosed and claimed an electrical regulating arrangement wherein relatively slow and quick regulating changes are produced in response to relatively small and large changes, respectively, in a condition to be regulated, both of these actions being normally intermittent at a uniform rate whose ratio of time of action to time of inaction varies in proportion to the deviation of the regulated condition from a predetermined normal value. Preferably, although not necessarily, the value of this ratio becomes substantially infinite during extreme conditions and the normally intermittent action merges into a practically uniform action.

In this arrangement the above described action is achieved through the variation of the value of a regulating resistance. I have found that in certain uses of this regulating arrangement, such as in the control of a synchronous condenser for regulating the voltage of a transmission line, the requirements are so severe as to interfere with the best operation of the arrangement. This is because in such uses the range of resistance variation must be relatively great, as the condenser must be able to operate from a greatly over-excited condition to a greatly under-excited condition. This means that a relatively large regulating resistance is required and as a consequence the slow acting resistance varying means requires a relatively long range of action and an inordinately long time to traverse its range. Also the quick acting means, which operates to quickly vary in relatively large blocks the value of the regulating resistance, is operating under a strain.

Furthermore, I have found that when the resistance is low, that is to say, during high excitation conditions in the regulated machine, a mere sudden increase in resistance will not suffice to reduce the excitation fast enough. For example, when a synchronous condenser is holding up the voltage by drawing a large wattless leading current through a transmission line and the load is suddenly lost the tendency is for the voltage to go to very high values and flash over the insulators unless the excitation of the condenser is very quickly reduced. A similar situation arises in connection with waterwheel driven generators which suddenly lose their load.

In accordance with my invention I have found that voltage varying means, such as a regulating resistance in the form of a Wheatstone bridge, results in a greatly improved operation of this regulating arrangement and in a virtual elimination of the operating difficulties which were described above. This is because with a bridge it is possible to go from a state of infinite effective resistance, i. e., a balanced bridge, to a state of substantially zero resistance, i. e., a completely unbalanced bridge having a pair of non-adjacent arms with zero resistance, by means of a relatively small actual resistance change. Furthermore, by overbalancing the bridge a very convenient way of reversing the polarity, or voltage, of a field winding, and consequently rapidly reducing excitation, is provided. Another advantageous consequence of the ability to provide reverse excitation is the fact that by this means residual magnetism may be completely bucked down so that, for example, a synchronous condenser can be operated with an absolute minimum excitation and maximum lagging current. This is not infrequently desirable.

I am aware that it is broadly old to employ a Wheatstone bridge as a regulating resistance and make no claim to such an arrangement broadly.

An object of my invention is to provide a new and improved electrical regulating arrangement.

Another object of my invention is to provide an electrical regulating arrangement with a Wheatstone bridge type regulating resistance and means for producing relatively slow and quick changes in the effective resistance value of said bridge in accordance with variations in a condition to be regulated.

A further object of my invention is to provide an electrical regulating arrangement for producing relatively slow and quick decreases in the excitation of a regulated machine, said relatively quick decreases in excitation being produced by momentary applications of a reverse voltage to an excitation controlling circuit.

My invention will be better understood from the following description taken in connection with the accompanying drawing and its scope will be pointed out in the appended claims.

Referring now to the single figure of the accompanying drawing, wherein I have shown diagrammatically an embodiment of my invention as arranged for regulating the voltage of a dynamo-electric machine, such as a synchronous generator 1, which is preferably provided with a conventional exciter 2 upon whose field winding circuit the regulator acts. For convenience of description my regulating arrangement may be considered as consisting of two separate parts, the regulator head, which is referred to generally by the character 3, and the regulating resistance assembly including its control equipment, which is indicated generally by the reference character 4.

The regulator head 3 is essentially the same as the regulator head described and claimed in my previously referred to co-pending application. It consists of a force-producing condition-responsive operating device, which in the present case is a three phase torque motor 5 connected to be responsive to the voltage of machine 1, a circuit controlling arrangement 6 which is connected to be operated by element 5, and an anti-hunting assembly 7, which is arranged to cooperate with the circuit controlling means 6. Motor 5 is so connected that when the voltage of machine 1 increases it produces a counter-clockwise torque, thereby lowering circuit controlling means 6, while when the voltage of machine 1 falls the net torque of motor 5 is reversed and circuit controlling means 6 is raised.

Circuit controlling means 6 comprises four relatively insulated contacts 8, 9, 10 and 11, of which contacts 9 and 10 are relatively resiliently mounted, slow-action-controlling lower and raise contacts, respectively, while contacts 8 and 11 are relatively stiffly mounted quick-action-controlling lower and raise contacts, respectively.

The anti-hunting assembly consists of what may be referred to as a star wheel contact 12, a smooth wheel contact 13 and any suitable motion producing means for rotating these wheels at a uniform speed. As shown, this means may consist of a small synchronous motor 14, such as is used for operating electric clocks. Electrically connected to this assembly is the positive terminal of any suitable source of control current. For preventing undue oscillations of assembly 6, a suitable damping means 15 is connected to motor 5.

Circuit conductors 16, 17, 18 and 19 are connected respectively to contacts 10, 9, 11 and 8 of control means 6. Conductors 16 and 17 are therefore the control conductors for the relatively slow acting raise and lower means, respectively, of the regulating arrangement, while conductors 18 and 19 control the relatively quick acting raise and lower means, respectively, of the regulating arrangement. These control conductors are energized in the following manner by head 3. On relatively small changes in voltage, contacts 9 or 10 are moved into engagement with star wheel 12 depending upon whether the change in voltage is a rise or fall. These conductors are therefore intermittently energized by impulses at a uniform rate. The bigger the change in voltage, the more pressure is applied between the star wheel and the contacts 9 or 10 and consequently the longer these contacts are in engagement with the star wheel. At a result, although the period of the intermittent energization of conductors 16 and 17 remains the same, the ratio of the time of energization to the time of de-energization increases with increases in change of voltage. When the change in voltage exceeds a predetermined amount, the resilient supports of contacts 9 and 10 are so flexed that contacts 8 or 11 engage wheel contact 13. Due, however, to the uneven surface of star wheel 12, control arrangement 6 is vibrated and consequently the engagement of contacts 8 and 11 with wheel 13 will be intermittent with the result that circuit conductors 18 and 19 will be intermittently energized at a uniform rate. As the change in voltage exceeds the predetermined amount required to cause engagement of contacts 8 and 11 with wheel 13 the ratio of the time of energization to the time of de-energization of circuits 18 and 19 will also increase because the increase in pressure between wheel 12 and contacts 9 and 11 will result in most of the motion of contacts 9 and 10 being absorbed by their resilient supports. By suitable construction the energization of conductors 18 and 19 may be made continuous at certain predetermined maximum variations in voltage.

The regulating resistance of assembly 4, which is controlled by conductors 16, 17, 18 and 19, comprises as its principal element a Wheatstone bridge consisting of four resistance arms 20, 21, 22 and 23, respectively. The input diagonal, or non-adjacent, terminals of this bridge are connected to be energized from any suitable source of direct current, such as a sub-exciter 24. The output diagonal, or non-adjacent, terminals of the bridge are connected to the field winding of main exciter 2. Thus, by varying the relative resistances of the arms of the bridge, that is to say, by varying the balance of the bridge, it is possible to vary the energization of the field winding of exciter 2 over the wide range from maximum excitation to zero excitation and even beyond this to a reverse excitation.

It will be obvious to those skilled in the art that there are many different ways of varying the balance of the Wheatstone bridge. In the arrangement which I have illustrated I control the balance of the bridge by simultaneously varying the resistance of arms 20 and 22 with respect to the resistance of arms 21 and 23. Arms 20 and 22 are electrically non-adjacent and would be diagonally opposite each other if the four arms of the bridge were arranged in the conventional diamond shape. Arms 20 and 22 are divided into two parts. The resistances of the left hand parts of each arm 20 and 22 are controlled simultaneously by suitable means 25 which is operated by any suitable means, such as a small reversible servo-motor 26. The right hand parts of arms 20 and 22 normally have constant resistance values which may, however, be varied simultaneously by suitable manual control means 27. These right hand parts are normally short circuited by means of a circuit controller or contactor 28 whose operation is controlled by conductor 19. A second circuit controller or contactor 29, which is connected to be controlled by conductor 18, is so arranged that when it is operated it simultaneously short circuits the left hand variable resistance parts of the arms 20 and 22. Motor 26 has its reversing connections controlled by a pair of circuit controllers or contactors 30 and 31 which are controlled respectively by conductors 16 and 17 whose circuits are completed through one or the other of a pair of limit switches 32 to the negative side of the control source. These limit switches are provided so as to limit the range of operation of the motor controlled resistance varying elements 25.

The bridge is preferably so arranged that the resistances of arms 21 and 23 are always equal, while the resistances of arms 20 and 22 are always equal to each other. Also, under normal conditions, the resistances of arms 20 and 22 are less than the resistances of arms 21 and 23 so that the current from source 24 flows through arms 20 and 22 to the field winding of exciter 2. With this arrangement, decreasing the value of the resistances of arms 20 and 22 to zero will increase the field current to a maximum value, while increasing the value of the resistances of arms 20 and 22 until they equal the resistances of arms 21 and 23 will result in a balance of the bridge and a zero current, or excitation, of the field winding of exciter 2. Increasing the value of the effective resistances of the left hand portions of arms 20 and 22 beyond this point will result in a reversal of excitation, because the exciting current will then flow through arms 21 and 23 instead of arms 20 and 22. The resistances of the right hand portions of arms 20 and 22 are preferably so adjusted by resistance-varying means 27 that when they are inserted in these arms by the operation of relay 28 they will cause a reverse voltage to be applied to the field winding of exciter 2 regardless of the values of the resistances of the left hand portions 20 and 22 at the time.

The operation of the illustrated embodiment of my invention is as follows: Assume that machines 1, 2 and 24 are being operated in their usual manner and that the voltage of machine 1 is normal. Under these conditions, the parts will be in positions illustrated in the drawing. Assume now that a drop in generator voltage takes place. Such a drop may be caused by any one of a number of circumstances, such for example, as the sudden application of load to the generator. This drop in voltage will cause motor 5 to move its circuit controlling means 6 upwardly until contact 10 engages star wheel 12. This engagement, which will be intermittent, completes the circuit from the positive side of the control source through star wheel 12, contact 10, conductor 16, contactor 30, right hand limit switch 32, to the negative side of the control source. Contactor 30 will thus be intermittently energized thereby intermittently to operate motor 26 in such a direction as to cut out resistance in arms 20 and 22. If the voltage drop is relatively slight, one or two energizations of contactor 30 will suffice to produce the necessary resistance change to cause the necessary change in excitation to restore the voltage of machine 1. However, the bigger the drop in voltage, the greater the pressure between wheel 12 and contact 10 and consequently the greater the ratio of the time of energization of contactor 30 to the time of its de-energization and consequently the greater the average speed of motor 26. Therefore, the greater the drop in voltage, the greater the speed of the motor operated means tending to restore the voltage.

If now, the drop in voltage is relatively large, contact 11, which is vibrating, will start to engage intermittently the smooth wheel contact 13. This will intermittently complete a circuit from the positive side of the source through wheel 13, contact 11, conductor 18, operating means of contactor 29 to the negative side of the source. The operation of contactor 29 will result in the short circuiting of the left hand portions of arms 20 and 22 with the result that the resistance of these arms will drop to zero intermittently. This, of course, will produce such comparatively large changes in excitation of the exciter, and consequently in the excitation of the regulated machine 1, that the regulating changes will be made very rapidly. The greater the drop in voltage, the greater will be the ratio of the time of energization of contactor 29 to the time of its deenergization and consequently the lower will be the average resistance of arms 20 and 22. It will thus be seen that the greater the drop in voltage, the greater will be the speed of action of the regulator as a whole in producing corrective changes.

In a like manner, if the voltage of circuit 1 should rise, motor 5 will cause circuit controlling means 6 to move downwardly until contact 9 touches star wheel 12, when a circuit will be completed for intermittently operating contactor 31 thereby to cause a reverse operation of motor 26 and an increased resistance of arms 20 and 22. If the rise in voltage is great enough contact 8 will come into engagement with contact 13, thereby controlling the operation, through conductor 19, of contactor 28 whereby the comparatively large resistances of the right hand part of arms 20 and 22 are suddenly inserted in these arms. The operation of contactor 28 will cause very rapid decreases in excitation because of the reverse voltage which it produces. Through the resilience of the support of contact 9 the ratio of the time of operation of contactors 31 and 28 to the time of their non-operation will also vary in proportion to the amount of voltage rise of the generator.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is,—

1. An electrical regulator having voltage-varying means in the form of a Wheatstone bridge whose state of balance is used to control regulating changes, means for unbalancing said bridge relatively slowing when a condition to be regulated changes relatively slightly, and means for unbalancing said bridge relatively rapidly when said condition changes by a relatively large amount.

2. In combination, a machine, a winding for controlling an operating condition of said machine, means including voltage-varying means in the form of a Wheatstone bridge for energizing said winding, regulating means for varying the balance of said bridge in accordance with variations in an operating condition of said machine, said regulating means acting to vary the balance of said bridge relatively slowly on relatively small variations of said condition and said regulating means acting to vary the balance of said bridge relatively rapidly on relatively large variations in said condition.

3. The combination with a machine, of a winding for controlling an operating condition of said machine, means for energizing said winding through voltage-varying means in the form of a Wheatstone bridge, regulating means responsive to an operating condition of said machine for varying the balance of said bridge, said means acting in response to relatively small changes in said condition for changing the balance of said bridge relatively slowly, said means acting in response to relatively large changes in said condition for producing relatively rapid change in the balance of said bridge, and means for making both of said actions intermittent.

4. The combination with a machine having an operating condition to be regulated, of a winding for controlling said condition, means for energizing said winding through voltage-varying means in the form of a Wheatstone bridge, regulating means for changing the balance of said bridge in response to changes in said operating condition, said means acting in response to relatively small changes in said condition for unbalancing said bridge relatively slowly, said means acting in responsse to relatively large changes in said condition for unbalancing said bridge relatively rapidly, said means including means for causing said actions to be intermittent at a uniform rate wherein the ratio of the time of action to the time of inaction varies in proportion to the variation of said condition.

5. In combination, a synchronous dynamo electric machine, a voltage regulator associated with said machine, said regulator being of the resistance type and having resistance elements in the form of a Wheatstone bridge whose state of balance determines the excitation of said machine, an electric motor arranged to vary the balance of said bridge, said regulator controlling the operation of said motor in response to relatively small changes in voltage, relays for producing relatively large changes in the balance of said bridge, said regulator controlling the operation of said relays in response to relatively large changes in voltage.

6. A regulator having control means arranged to act in response to variations in a condition to be regulated, and means acted upon by said control means for varying the energization of an electric circuit, said means including means for producing an inverse voltage in said circuit, said action being such that upon relatively small changes in said condition said energization is varied relatively slowly and upon relatively large changes in said condition said energization is varied relatively rapidly, rapid decreases in energization being produced by the application of an inverse voltage.

7. The combination with a dynamo electric machine having an operating condition to be regulated, of a field winding whose energization controls said condition, regulating means for controlling the excitation of said winding in accordance with variations in said condition, said regulating means including means for applying an inverse voltage to said winding, said regulating means acting on relatively small changes in said condition to vary said excitation relatively slowly, said means acting on relatively large changes in said condition to produce relatively rapid changes in said excitation, relatively rapid decreases in said excitation being secured by the application of a relatively large inverse voltage to said winding.

8. The combination with a dynamo electric machine having an operating condition to be regulated, of a field winding whose energization controls said condition, regulating means for controlling the excitation of said winding in accordance with variations in said condition, said regulating means including means for applying an inverse voltage to said winding, said regulating means acting on relatively small changes in said condition to vary said excitation relatively slowly over a range from a maximum positive value through zero to a relatively slightly negative value, said means acting on relatively large changes in said condition to produce relatively rapid changes in said excitation, relatively rapid decreases in said excitation being secured by the application of a relatively large inverse voltage to said winding.

9. The combination with a dynamo electric machine having an operating condition to be regulated, of a field winding whose energization controls said condition, regulating means for controlling the excitation of said winding in accordance with variations in said condition, said regulating means including means for applying an inverse voltage to said winding, said regulating means acting on relatively small changes in said condition to vary said excitation relatively slowly, said means acting on relatively large changes in said condition to produce relatively rapid changes in said excitation, relatively rapid decreases in said excitation being secured by the application of a relatively large inverse voltage to said winding, said means including means for making said actions intermittent.

10. The combination with a dynamo electric machine having an operating condition to be regulated, of a field winding whose energization controls said condition, regulating means for controlling the excitation of said winding in accordance with variations in said condition, said regulating winding including means for applying an inverse voltage to said winding, said regulating means acting on relatively small changes in said condition to vary said excitation relatively slowly, said means acting on relatively large changes in said condition to produce relatively rapid changes in said excitation, relatively rapid decreases in said excitation being secured by the application of a relatively large inverse voltage to said winding, said means including means for causing said actions to be intermittent at a uniform rate wherein the ratio of the time of action to the time of inaction varies in proportion to the variation of said condition.

11. In combination, a synchronous dynamo electric machine, a voltage regulator associated therewith, said regulator having resistance means for controlling the excitation of said machine, said resistance means being so arranged that variations in its effective value tend to cause reversal of the excitation of said machine, a motor arranged to vary the effective value of said resistance means relatively slowly, quick acting electroresponsive means for varying the effective value of said resistance means so as to tend to cause reversal of said excitation, said regulator starting said motor on relatively small voltage changes and operating said electroresponsive means on relatively large voltage changes.

In witness whereof, I have hereunto set my hand.

LOUIS W. THOMPSON.